US009608958B2

(12) United States Patent
Bobrov et al.

(10) Patent No.: US 9,608,958 B2
(45) Date of Patent: Mar. 28, 2017

(54) LIGHTWEIGHT DIRECTORY ACCESS PROTOCOL (LDAP) JOIN SEARCH MECHANISM

(71) Applicant: Oracle International Corporation, Redwood Shores, CA (US)

(72) Inventors: Anton Bobrov, Savoie (FR); Gilles Bellaton, Montbonnot St Martin (FR)

(73) Assignee: Oracle International Corporation, Redwood Shores, CA (US)

( * ) Notice: Subject to any disclaimer, the term of this patent is extended or adjusted under 35 U.S.C. 154(b) by 243 days.

(21) Appl. No.: 14/091,214

(22) Filed: Nov. 26, 2013

(65) Prior Publication Data
US 2014/0280943 A1 Sep. 18, 2014

Related U.S. Application Data

(60) Provisional application No. 61/777,932, filed on Mar. 12, 2013.

(51) Int. Cl.
*H04L 29/12* (2006.01)
*H04L 29/06* (2006.01)

(52) U.S. Cl.
CPC ...... *H04L 61/1523* (2013.01); *H04L 63/0823* (2013.01); *H04L 63/102* (2013.01); *H04L 61/1552* (2013.01)

(58) Field of Classification Search
None
See application file for complete search history.

(56) References Cited

U.S. PATENT DOCUMENTS 5,892,909 A 4/1999 Grasso et al.
5,911,143 A 6/1999 Deinhart et al.
(Continued)

FOREIGN PATENT DOCUMENTS

EP 1914951 A1 4/2008
EP 2458548 A1 5/2012
(Continued)

OTHER PUBLICATIONS

U.S. Appl. No. 13/842,269, Non Final Office Action mailed on Jun. 5, 2014, 12 pages.
(Continued)

*Primary Examiner* — Ninos Donabed
(74) *Attorney, Agent, or Firm* — Kilpatrick Townsend & Stockton LLP

(57) ABSTRACT

Complex search tasks are performed relative to an LDAP directory with a minimal quantity of LDAP search operations. Search tasks that follow relationships between LDAP entries can be performed, even under circumstances in which those relationships are not represented by the hierarchical structure of the LDAP directory. A client application can specify an LDAP control that the client application sends to the LDAP server along with the LDAP search operation. The LDAP server's receipt of the LDAP control can cause the LDAP server to modify the behavior of the search operation so that the LDAP server follows potentially non-hierarchical specified relationships between the LDAP entries in determining the set of entries to return as results of the search operation. As a result, the LDAP server can return a complete set of related result entries to the client application in response to a single LDAP search operation directed by the application.

17 Claims, 5 Drawing Sheets

(56) References Cited

U.S. PATENT DOCUMENTS

| | | | |
|---|---|---|---|
| 6,052,684 A | 4/2000 | Du | |
| 6,085,188 A | 7/2000 | Bachmann et al. | |
| 6,236,988 B1 | 5/2001 | Aldred | |
| 6,424,358 B1* | 7/2002 | DiDomizio | G06F 17/30386 707/999.01 |
| 6,516,416 B2 | 2/2003 | Gregg et al. | |
| 6,523,028 B1* | 2/2003 | DiDomizio | G06F 17/30398 707/748 |
| 6,526,513 B1 | 2/2003 | Shrader et al. | |
| 6,553,364 B1 | 4/2003 | Wu | |
| 7,031,967 B2 | 4/2006 | Cheng et al. | |
| 7,051,039 B1 | 5/2006 | Murthy et al. | |
| 7,130,839 B2 | 10/2006 | Boreham et al. | |
| 7,136,867 B1 | 11/2006 | Chatterjee et al. | |
| 7,290,288 B2 | 10/2007 | Gregg et al. | |
| 7,664,866 B2 | 2/2010 | Wakefield | |
| 7,921,299 B1 | 4/2011 | Anantha et al. | |
| 7,953,896 B2 | 5/2011 | Ward et al. | |
| 7,992,194 B2 | 8/2011 | Damodaran et al. | |
| 8,095,629 B2 | 1/2012 | Ward et al. | |
| 8,151,323 B2 | 4/2012 | Harris et al. | |
| 8,185,501 B1* | 5/2012 | Cherukumudi | G06F 17/30563 707/610 |
| 8,266,616 B1 | 9/2012 | Jacquot et al. | |
| 8,291,490 B1 | 10/2012 | Ahmed et al. | |
| 8,321,921 B1 | 11/2012 | Ahmed et al. | |
| 8,387,136 B2 | 2/2013 | Lee et al. | |
| 8,387,137 B2 | 2/2013 | Lee et al. | |
| 8,402,514 B1 | 3/2013 | Thompson et al. | |
| 8,434,129 B2 | 4/2013 | Kannappan et al. | |
| 8,499,005 B2 | 7/2013 | Brooks et al. | |
| 8,572,602 B1 | 10/2013 | Colton et al. | |
| 8,631,477 B2 | 1/2014 | Chen et al. | |
| 8,631,478 B2 | 1/2014 | Chen et al. | |
| 8,769,622 B2 | 7/2014 | Chang et al. | |
| 8,769,704 B2 | 7/2014 | Peddada et al. | |
| 8,789,157 B2 | 7/2014 | Sinn | |
| 8,806,593 B1 | 8/2014 | Raphel et al. | |
| 8,843,997 B1 | 9/2014 | Hare | |
| 9,053,302 B2 | 6/2015 | Sastry et al. | |
| 9,058,471 B2 | 6/2015 | Sastry et al. | |
| 9,286,375 B2* | 3/2016 | Rowley | G06F 17/30607 |
| 2002/0059210 A1 | 5/2002 | Makus et al. | |
| 2004/0243941 A1 | 12/2004 | Fish | |
| 2005/0144033 A1 | 6/2005 | Vreeke et al. | |
| 2005/0228793 A1* | 10/2005 | Betts | G06F 17/3066 |
| 2005/0273346 A1 | 12/2005 | Frost | |
| 2006/0059539 A1 | 3/2006 | Shashikumar et al. | |
| 2006/0089938 A1* | 4/2006 | Leonard | H04L 12/24 |
| 2006/0143704 A1 | 6/2006 | Rits et al. | |
| 2006/0277595 A1 | 12/2006 | Kinser et al. | |
| 2007/0005536 A1 | 1/2007 | Caswell et al. | |
| 2007/0028098 A1 | 2/2007 | Baartman et al. | |
| 2007/0150480 A1 | 6/2007 | Hwang et al. | |
| 2007/0169168 A1 | 7/2007 | Lim | |
| 2007/0283147 A1 | 12/2007 | Fried et al. | |
| 2008/0080718 A1 | 4/2008 | Meijer et al. | |
| 2008/0083036 A1 | 4/2008 | Ozzie et al. | |
| 2008/0089520 A1 | 4/2008 | Keszler | |
| 2008/0147584 A1 | 6/2008 | Buss | |
| 2008/0189250 A1 | 8/2008 | Cha et al. | |
| 2008/0189304 A1* | 8/2008 | Rowley | G06F 17/30607 |
| 2008/0256095 A1* | 10/2008 | Wakefield | H04L 61/1517 |
| 2008/0256250 A1* | 10/2008 | Wakefield | H04L 63/104 709/229 |
| 2008/0256606 A1 | 10/2008 | Koikara et al. | |
| 2008/0281617 A1 | 11/2008 | Conrad et al. | |
| 2008/0313716 A1 | 12/2008 | Park | |
| 2009/0024522 A1 | 1/2009 | Reunert et al. | |
| 2009/0089407 A1 | 4/2009 | Chalupa et al. | |
| 2009/0112818 A1* | 4/2009 | Jose | G06F 17/30445 |
| 2009/0126007 A1 | 5/2009 | Zamberlan et al. | |
| 2009/0133110 A1* | 5/2009 | Kumar | H04L 29/12122 726/8 |
| 2009/0144729 A1 | 6/2009 | Guizar | |
| 2009/0178102 A1 | 7/2009 | Alghathbar et al. | |
| 2009/0205018 A1 | 8/2009 | Ferraiolo et al. | |
| 2009/0217267 A1 | 8/2009 | Gebhart et al. | |
| 2009/0259683 A1 | 10/2009 | Murty | |
| 2009/0265753 A1 | 10/2009 | Anderson et al. | |
| 2009/0320093 A1 | 12/2009 | Glazier et al. | |
| 2010/0125477 A1 | 5/2010 | Mousseau et al. | |
| 2010/0146517 A1* | 6/2010 | Aschen | H04L 67/32 718/105 |
| 2010/0198730 A1 | 8/2010 | Ahmed et al. | |
| 2010/0211781 A1 | 8/2010 | Auradkar et al. | |
| 2010/0262631 A1* | 10/2010 | Andersson | G06F 17/30569 707/809 |
| 2010/0306818 A1 | 12/2010 | Li et al. | |
| 2011/0126207 A1 | 5/2011 | Wipfel et al. | |
| 2011/0131146 A1 | 6/2011 | Skutnik | |
| 2011/0138051 A1 | 6/2011 | Dawson et al. | |
| 2011/0296018 A1 | 12/2011 | Deng et al. | |
| 2011/0307523 A1 | 12/2011 | Balani et al. | |
| 2011/0307543 A1* | 12/2011 | Megginson | G06F 17/30194 709/203 |
| 2011/0313902 A1 | 12/2011 | Liu et al. | |
| 2011/0314466 A1 | 12/2011 | Berg et al. | |
| 2012/0005341 A1 | 1/2012 | Seago et al. | |
| 2012/0066755 A1 | 3/2012 | Peddada et al. | |
| 2012/0079134 A1 | 3/2012 | Outhred et al. | |
| 2012/0096521 A1 | 4/2012 | Peddada | |
| 2012/0131166 A1 | 5/2012 | Barbedette et al. | |
| 2012/0131194 A1 | 5/2012 | Morgan | |
| 2012/0136936 A1 | 5/2012 | Quintuna | |
| 2012/0203781 A1* | 8/2012 | Wakefield | H04L 29/12169 707/736 |
| 2012/0221454 A1 | 8/2012 | Morgan | |
| 2012/0226796 A1 | 9/2012 | Morgan | |
| 2012/0226808 A1 | 9/2012 | Morgan | |
| 2012/0246248 A1 | 9/2012 | Arita | |
| 2012/0284776 A1 | 11/2012 | Sundaram et al. | |
| 2012/0297441 A1 | 11/2012 | Boldyrev et al. | |
| 2012/0304191 A1 | 11/2012 | Morgan | |
| 2012/0311154 A1 | 12/2012 | Morgan | |
| 2013/0007195 A1 | 1/2013 | Rinard et al. | |
| 2013/0007265 A1 | 1/2013 | Benedetti et al. | |
| 2013/0014107 A1 | 1/2013 | Kirchhofer | |
| 2013/0047230 A1 | 2/2013 | Krishnan et al. | |
| 2013/0110943 A1 | 5/2013 | Menon et al. | |
| 2013/0124401 A1 | 5/2013 | Del Real | |
| 2013/0152183 A1 | 6/2013 | Plewnia et al. | |
| 2013/0204994 A1 | 8/2013 | Deshmukh et al. | |
| 2013/0212160 A1 | 8/2013 | Lawson et al. | |
| 2013/0212420 A1 | 8/2013 | Lawson et al. | |
| 2013/0254882 A1 | 9/2013 | Kannappan et al. | |
| 2013/0268480 A1 | 10/2013 | Dorman | |
| 2013/0268491 A1 | 10/2013 | Chung et al. | |
| 2013/0275509 A1 | 10/2013 | Micucci et al. | |
| 2013/0283350 A1 | 10/2013 | Afek et al. | |
| 2013/0290710 A1 | 10/2013 | Broder et al. | |
| 2013/0298212 A1 | 11/2013 | Shah et al. | |
| 2013/0318241 A1 | 11/2013 | Acharya et al. | |
| 2013/0332984 A1 | 12/2013 | Sastry et al. | |
| 2013/0332985 A1 | 12/2013 | Sastry et al. | |
| 2014/0020054 A1 | 1/2014 | Lim | |
| 2014/0059002 A1 | 2/2014 | Lockhart et al. | |
| 2014/0074539 A1 | 3/2014 | Doering et al. | |
| 2014/0074540 A1 | 3/2014 | Evans et al. | |
| 2014/0074544 A1 | 3/2014 | Seetharam et al. | |
| 2014/0074659 A1 | 3/2014 | Chatterjee et al. | |
| 2014/0074788 A1 | 3/2014 | Chatterjee et al. | |
| 2014/0074793 A1 | 3/2014 | Doering et al. | |
| 2014/0074999 A1 | 3/2014 | Khalsa et al. | |
| 2014/0075016 A1 | 3/2014 | Chatterjee et al. | |
| 2014/0075027 A1 | 3/2014 | Chatterjee et al. | |
| 2014/0075031 A1 | 3/2014 | Doering et al. | |
| 2014/0075032 A1 | 3/2014 | Vasudevan et al. | |
| 2014/0075033 A1 | 3/2014 | Doering et al. | |
| 2014/0075034 A1 | 3/2014 | Vasudevan et al. | |
| 2014/0075239 A1 | 3/2014 | Prathipati et al. | |
| 2014/0075499 A1 | 3/2014 | Arun et al. | |
| 2014/0075501 A1 | 3/2014 | Srinivasan et al. | |

(56) References Cited

U.S. PATENT DOCUMENTS

| | | | |
|---|---|---|---|
| 2014/0075565 A1 | 3/2014 | Srinivasan et al. | |
| 2014/0141743 A1 | 5/2014 | Shaw | |
| 2014/0143083 A1 | 5/2014 | Prathipati et al. | |
| 2014/0310243 A1* | 10/2014 | McGee | G06F 17/30575 707/639 |
| 2015/0074279 A1 | 3/2015 | Maes et al. | |
| 2015/0363600 A1* | 12/2015 | Jin | H04L 63/0281 726/26 |

FOREIGN PATENT DOCUMENTS

| | | |
|---|---|---|
| WO | 2009/018584 A1 | 2/2009 |
| WO | WO2010149222 A1 | 12/2010 |
| WO | 2014039772 | 3/2014 |
| WO | 2014039882 | 3/2014 |
| WO | 2014039918 | 3/2014 |
| WO | 2014039919 | 3/2014 |
| WO | 2014039921 | 3/2014 |

OTHER PUBLICATIONS

International Application No. PCT/US2013/058642, Invitation to restrict or pay additional fees mailed on Jul. 23, 2014, 3 pages.
Non-Final Office Action mailed on Aug. 28, 2014, in U.S. Appl. No. 13/838,113, 14 pages.
Non-Final Office Action mailed on Sep. 11, 2014, in U.S. Appl. No. 13/838,537, 22 pages.
Non-Final Office Action mailed on Aug. 14, 2014, in U.S. Appl. No. 13/838,813, 22 pages.
Written Opinion mailed on Aug. 19, 2014, International Application No. PCT/US2013/058426, 7 pages.
Written Opinion mailed on Aug. 19, 2014, International Application No. PCT/US2013/058596, 6 pages.
Written Opinion mailed on Sep. 11, 2014, International Application No. PCT/US2013/058642, 8 pages.
"Using ldapsearch," *Red Hat Directory Server 8.2 Administration Guide for managing Directory Server instances Edition 8.2.8*, Red Hat, Inc. (copyright 2010) 3 pages.
Hunter "LDAP Searching—Setting the Scope Parameters," available at http://www.idevelopment.info/data/LDAP/LDAP_Resources/SEARCH_Setting_the_SCOPE_Parameter.shtml (copyright 1998-2013) 2 pages.
"LDAP Authentication Overview," Juniper Networks, Inc. (copyright 1999-2010) 4 pages.
"Basic Traversals," The Neo4J Manual, Neo Technology, Inc. (copyright 2012) 7 pages.
International Patent Application No. PCT/US2013/058639, International Search Report and Written Opinion, mailed Jan. 8, 2014, 10 pages.
International Patent Application No. PCT/US2013/058642, International Search Report and Written Opinion, mailed Feb. 7, 2014, 17 pages.
International Patent Application No. PCT/US2013/058638, International Search Report and Written Opinion, mailed Jan. 8, 2014, 11 pages.
International Patent Application No. PCT/US2013/058596, International Search Report and Written Opinion, mailed Nov. 22, 2013, 9 pages.
Afgan et al. "CloudMan as a Tool Execution Framework for the Cloud ," IEEE Proceedings of the 35th International Convention on Information and Communication Technology, Electronics and Microelectronics (MIPRO 2012), pp. 437-441 (2012).
Bastos et al. "Towards a Cloud-Based Environment for Space Systems Concept Design ," IEEE International Conference on Information Society (I-Society), pp. 478-483 (2012).
Paul et al. "Architectures for the future networks and the next generation Internet: A survey ," Computer Communications 34:2-42 (2011).

An Introduction to Role-Based Access Control, NIST/ITL Bulletin, Retrieved from the Internet: URL: http://csrc.nist.gov/groups/SNS/rbac/documents/design_implementation/Intro_role_based_access.htm on Oct. 22, 2013, Dec. 1995, 5 pages.
Oracle Internet Directory Administrator's Guide: Introduction to LDAP and Oracle Internet Directory, Oracle, 10g Release 2, B14082-02, Retrieved from the Internet: URL: http://docs.oracle.com/cd/B14099_19/idmanage.1012/b14082/intro.htm on Oct. 1, 2013, 1999, 9 pages.
XACML v3.0 Hierarchical Resource Profile Version 1.0, Oasis, Working Draft 7, Retrieved from the Internet: URL: http://xml.coverpages.org/XACML-v30-HierarchicalResourceProfile-WD7.pdf on Aug. 29, 2013, Apr. 1, 2009, 22 pages.
U.S. Appl. No. 13/485,372, Non-Final Office Action, mailed Feb. 28, 2013, 14 pages.
Anthony et al., "Consolidation Best Practices: Oracle Database 12c plugs you into the cloud", Oracle White Paper, Retrieved from the Internet: URL: http://www.oracle.com/us/products/database/database-private-cloud-wp-360048.pdf on Oct. 1, 2013, Jul. 2013, 30 pages.
Bierman et al., "Network Configuration Protocol (NETCONF) Access Control Model", Internet Engineering Task Force, RFC 6536, Retrieved from the Internet: URL: http://tools.ietf.org/html/rfc6536 on Aug. 29, 2013, Mar. 2012, 50 pages.
Chanliau et al., "Oracle Fusion Middleware: Oracle Platform Security Services (OPSS) FAQ", Oracle, Retrieved from the Internet: URL: http://www.oracle.com/technetwork/testcontent/opss-faq-131489.pdf on Oct. 1, 2013, Jul. 2010, 6 pages.
Chiba et al., "Dynamic Authorization Extension to Remote Authentication Dial in User Service (Radius)", Network Working Group, RFC 5176, Retrieved from the Internet: URL: http://tools.ietf.org/html/rfc5176 on Aug. 29, 2013, Jan. 2008, 35 pages.
Clemm et al., "Web Distributed Authoring and Versioning (WebDAV) Access Control Protocol", Network Working Group, RFC 3744, Retrieved from the Internet: URL: http://www.ietf.org/rfc/rfc3744.txt on Aug. 29, 2013, May 2004, 66 pages.
Datta et al., "Oracle Fusion Middleware Developer's Guide for Oracle Identity Manager", Oracle, 11g Release 2, E27150-08, Retrieved from the Internet: URL: http://docs.oracle.com/cd/E37115_01/dev.1112/e27150/toc.htm on Oct. 1, 2013, Sep. 2013, 1102 pages.
International Patent Application No. PCT/US2013/058426, International Search Report and Written Opinion, mailed Nov. 8, 2013, 9 pages.
Subi et al., "Oracle Fusion Middleware Application Security Guide", Oracle, 11g Release 1, E10043-09, Retrieved from the Internet: URL: http://docs.oracle.com/cd/E21764_01/core.1111/e10043/underjps.htm on Oct. 1, 2013, May 2011, 834 pages.
Teger et al., "Oracle Fusion Middleware Developer's Guide for Oracle Access Management", Oracle, 11g Release 2, E27134-06, Retrieved from the Internet: URL: http://docs.oracle.com/cd/E37115_01/dev.1112/e27134/toc.htm on Oct. 1, 2013, Jul. 2013, 372 pages.
Teger, "Oracle Fusion Middleware Developer's Guide for Oracle Entitlements Server", Oracle, 11g Release 1, E27154-01, Retrieved from the Internet: URL: http://docs.oracle.com/cd/E27559_01/dev.1112/e27154/handle_auth_calls.htm on Oct. 1, 2013, Jul. 2012, 132 pages.
Demarest et al., Oracle Cloud Computing, An Oracle White Paper, Oracle Corporation, Redwood Shores, CA, May 2010, 22 pages.
Oracle—Breaking Cloud Security Barriers with Identity Management, Oracle, 2010, 37 pages.
Oracle Identity Management 11 g—An Oracle Whitepaper, Oracle, Jul. 2010, 61 pages.
Alcaraz Calero, Jose M. et al., "Toward a Multi-Tenancy Authorization System for Cloud Services", IEEE Computer and Realibily Societies, Nov./Dec. 2010, pp. 48-55.
Tsai, Wei-Tek et al., "Role-Based Access Control Using Reference Ontology in Clouds", IEEE, 2011 Tenth International Symposium on Autonomous Decentralized Systems, 2011, pp. 121-128.
Wainwright, Steve, "Oracle Public Cloud—An Enterprise Cloud for Business Critical Applications", Oracle, 2011, 39 pages.

(56) References Cited

OTHER PUBLICATIONS

Oracle Unveils Oracle Public Cloud, Oracle, Oct. 5, 2011, 2 pages.
Lau, Christina et al., "Best Practices for access control in multi-tenant cloud solutions using Tivoli Access Manager", IBM, DeveloperWorks, May 1, 2011, 8 pages.
Rashee, Haroon et al., "Multi-Tenancy on Private Cloud", Enlighten, Feb. 2012, 20 pages.
The Oracle Identity Management Platform: Identity Services at Internet Scale, Oracle, Jul. 2012, 20 pages.
U.S. Appl. No. 13/842,269, Notice of Allowance mailed on Nov. 3, 2014, 8 pages.
U.S. Appl. No. 14/019,051, Non-Final Office Action mailed on Nov. 20, 2014, 5 pages.
U.S. Appl. No. 13/838,813, Final Office Action mailed on Dec. 4, 2014, 24 pages.
U.S. Appl. No. 13/842,833, Notice of Allowance mailed on Dec. 15, 2014, 11 pages.
U.S. Appl. No. 13/840,943, Non-Final Office Action mailed on Dec. 18, 2014, 10 pages.
U.S. Appl. No. 13/907,689, Non-Final Office Action mailed on Jan. 7, 2015, 11 pages.
U.S. Appl. No. 13/843,613, Non-Final Office Action mailed on Jan. 23, 2015, 17 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
Ranganathan, Sridhar. Architecting the Oracle VM solution using the Oracle Sun ZFS Storage Appliances and Oracle Sun Servers. Sep. 2010 [retrieved on Jun. 2, 2015]. Retrieved from the Internet: <URL: http://www.oracle.com/technetwork/articles/systems-hardware-architecture/vm-solutionusing-zfs-storage-174070.pdf>.
Haslam, Simon. 'Virtualisation arrives for Exalogic 2—Details from Launch Event'. Jul. 26, 2012 [retrieved on Jun. 2, 2015]. Retrieved from the Internet: <URL: http://www.veriton.co.uk/roller/fmw/entry/exalogic_2_details_from_launch>.
Non-Final Office Action mailed Feb. 18, 2015 in U.S. Appl. No. 13/835,307, 12 pages.
Written Opinion mailed Apr. 22, 2015 in International Patent Application No. PCT/US2013/058638, 7 pages.
Final Office Action mailed May 21, 2015 in U.S. Appl. No. 13/907,689, 12 pages.
Non-Final Office Action mailed Jun. 11, 2015 in U.S. Appl. No. 13/844,018, 27 pages.
Non-Final Office Action mailed Jun. 19, 2015 in U.S. Appl. No. 13/836,625, 41 pages.
Koved et al., Access Rights Analysis for Java, Proceedings of the 17th ACM SIGPLAN conference on Object-oriented programming, systems, languages, and applications, 2002, pp. 359-372.
Kagal et al., A Policy Language for a Pervasive Computing Environment, Proceedings of the 4th IEEE International Workshop on Policies for Distributed Systems and Networks, 2003, pp. 63-74.
Emig et al., An Access Control Metamodel for Web Service-Oriented Architecture, IEEE, 2007, pp. 1-8.
Jahid et al., MyABDAC: Compiling XACML Policies for Attribute-Based Database Access Control, ACM, Feb. 23, 2011, pp. 97-108.
Notice of Allowance mailed Feb. 4, 2015 in U.S. Appl. No. 13/838,537, 19 pages.
Notice of Allowance mailed Feb. 23, 2015 in U.S. Appl. No. 13/838,113, 15 pages.
Non-Final Office Action mailed Mar. 12, 2015 in U.S. Appl. No. 13/838,813, 21 pages.

* cited by examiner

LIGHTWEIGHT DIRECTORY ACCESS PROTOCOL (LDAP) JOIN SEARCH MECHANISM

CLAIM OF PRIORITY

The present application claims priority under 35 U.S.C. §119(e) to Provisional U.S. Patent Application Ser. No. 61/777,932, filed Mar. 12, 2013, and titled "LIGHTWEIGHT DIRECTORY ACCESS PROTOCOL (LDAP) JOIN SEARCH MECHANISM", the contents of which are incorporated by reference herein.

BACKGROUND

The present application relates to the processing of lightweight directory access protocol (LDAP) searches.

The Lightweight Directory Access Protocol (LDAP) is a network protocol for accessing directories. It is based on the X.500, a Comité Consultatif International Téléphonique et Télégraphique (CCITT) standard for directory services that is part of the Open Systems Interconnection (OSI) suite of services. The X.500 directory service is a global directory service. Its components cooperate to manage information about objects such as countries, organizations, people, machines, and so on in a worldwide scope. It provides the capability to look up information by name (a "white pages" service) and to browse and search for information (a "yellow pages" service).

The information is held in a directory information base (DIB). Entries in the DIB are arranged in a tree structure called the directory information tree (DIT). Each entry is a named object and consists of a set of attributes. Each attribute has a defined attribute type and one or more values. The directory schema defines the mandatory and optional attributes for each class of object (called the object class). Each named object may have one or more object classes associated with it.

The X.500 namespace is hierarchical. An entry is unambiguously identified by a distinguished name (DN). A distinguished name is the concatenation of selected attributes from each entry, called the relative distinguished name (RDN), in the tree along a path leading from the root down to the named entry. Users of the X.500 directory may (subject to access control) interrogate and modify the entries and attributes in the DIB.

Although the concepts of distinguished names and relative distinguished names are core to the X.500 model, the X.500 standard itself does not define any string representation for names. What is communicated between the X.500 components is the structural form of names. The reasoning behind this is that the standard is sufficient to allow different implementations to interoperate. String names are not communicated between different implementations. Instead, they are necessary only for interaction with end-users. For that purpose, the standard allows any representation, not necessarily only string representations.

Each system that is based on the X.500 model, such as the LDAP, defines its own string representation. For example, in the LDAP, a DN's RDNs are arranged right to left, separated by the comma character (","). For example, a name that starts with "c=us" at the top and leads to "cn=Rosanna Lee" at the leaf may be expressed in the string:

cn=Rosanna Lee, ou=People, o=Sun, c=us

Internet Engineering Task Force (IETF) Request For Comments (RFC) 1777 defines what is now called version 2 of the LDAP (or LDAP v2). LDAP v2 is a protocol that can be easily implemented, with special focus on being able to build small and simple clients. One way that LDAP v2 achieves simplification is by using a lot of strings and minimizing wherever possible the use of structures. DNs, for example, are represented in the protocol as strings, as are attribute type names and many attribute values. The protocol consists of the client's sending requests to the server, to which the server responds, though not necessarily in the same order in which the requests were sent. Each request is tagged with an ID so that requests and responses can be matched. The protocol works over either Transmission Control Protocol (TCP) or User Datagram Protocol (UDP), although the TCP version is most commonly used. Because of the focus on clients, the LDAP community also defines standards for the string representation of DNs (in IETF RFC 1779), search filters (in IETF RFC 1960), and attribute syntaxes (in IETF RFC 1778), for a C language-based application programming interface (API) (in IETF RFC 1823), and for the format of uniform resource locators (URLs) for accessing LDAP services (in IETF RFC 1959). IETF RFCs 1777, 1779, 1960, 1778, 1823, and 1959, available online at ietf.org, are incorporated by reference herein.

Various operations are defined in the LDAP v2. The "bind" operation is used to start a connection with the LDAP server. The LDAP is a connection-oriented protocol. The client specifies the protocol version and the client authentication information. The "unbind" operation is used to terminate the connection with the LDAP server. The "search" operation is used to search the directory. The client specifies the starting point (base object) of the search, the search scope (the object only, its children, or the subtree rooted at the object), and a search filter (as discussed in IETF RFC 1960). It can also supply other information to control the search, such as the names of the attributes to return and the size and time limits. The search results consist of LDAP entries (and the attributes requested) that satisfy the filter. The "modify" operation is used to modify an existing entry. The client specifies the name of the entry to be modified and a list of modifications. Each modification consists of an attribute and information regarding whether its values are to be added, deleted, or replaced. The "add" operation is used to add a new entry. The client specifies the name of the new entry and a set of attributes for the new entry. The "delete" operation is used to remove an existing entry. The client specifies the name of the entry to remove. The "modify RDN" operation is used to change the RDN of the last component of an existing entry (that is, to assign the entry a new name in the same context). The client specifies the DN for the entry and the new RDN. The "compare" operation is used to test whether an entry has an attribute/value pair. The client specifies the name of the entry and the name and value to check. The "abandon" operation is used to terminate an outstanding request. IETF RFC 1960, available online at ietf.org, is incorporated by reference herein.

One of the most useful features that an LDAP directory offers is its "yellow pages," or "search," service, mentioned above in the discussion of operations. An application can compose a query consisting of attributes of entries that the application is seeking and submit that query to the directory. The directory then returns a list of entries that satisfy the query. For example, an application could ask the directory for all entries with a bowling average greater than 200 or all entries that represent a person with a surname beginning with "Sch." The simplest form of search requires that the application specify a set of attributes that an entry must have and the name of the target context in which to perform the search. In addition to specifying a search using a set of attributes, an application can specify a search in the form of a search filter. A search filter is a search query expressed in the form of a logical expression. The syntax of search filters is described in IETF RFC 2254. The following search filter specifies that the qualifying entries must have an "sn" attribute with a value of "Geisel" and a "mail" attribute with any value:

(&(sn=Geisel)(mail=*))

Each item in the filter is composed using an attribute identifier and either an attribute value or symbols denoting the attribute value. For example, the item "sn=Geisel" means that the "sn" attribute must have the attribute value "Geisel" and the item "mail=*" indicates that the "mail" attribute must be present. Each item is enclosed within a set of parentheses, as in "(sn=Geisel)." These items are composed using logical operators such as "&" (conjunction) to create logical expressions, as in the immediately foregoing example. Each logical expression can be further composed of other items that themselves are logical expressions, as in the following search filter:

(|(& (sn=Geisel) (mail=*)) (sn=L*))

This example requests either entries that have both a "sn" attribute of "Geisel" and the "mail" attribute or entries whose "sn" attribute begins with the letter "L." IETF RFC 2254, available online at ietf.org, is incorporated by reference herein.

The LDAP v3 (defined in RFC 2251) is designed to address some of the limitations of the LDAP v2 in the areas of internationalization, authentication, referral, and deployment. It also allows new features to be added to the protocol without also requiring changes to the protocol. This is done by using extensions and controls. In addition to the repertoire of predefined operations, such as "search" and "modify," the LDAP v3 defines an "extended" operation. The "extended" operation takes a request as an argument and returns a response. The request contains an identifier that identifies the request and the arguments of the request. The response contains the results of performing the request. The pair of "extended" operation request/response is called an extension. For example, there can be an extension for "Start TLS," which is a request for the client to the server to activate the Start TLS protocol. These extensions can be standard (defined by the LDAP community) or proprietary (defined by a particular directory vendor). Another way to add new features is by using a control. The LDAP v3 allows the behavior of any operation to be modified through the use of controls. Any number of controls may be sent along with an operation, and any number of controls may be returned with its results. For example, a "sort" control can be sent along with a "search" operation, where the "sort" control can tell the LDAP server to sort the results of the search according to a "name" attribute. Like extensions, such controls can be standard or proprietary. IETF RFC 2251, available online at ietf org, is incorporated by reference herein.

In the LDAP v3, a control can be either a request control or a response control. A request control is sent from the client to the server along with an LDAP operation. A response control is sent from the server to the client along with an LDAP response. An application typically does not deal directly with the control interface. Instead, it deals with classes that implement this interface. The application gets control classes either as part of a repertoire of controls standardized through the IETF or from directory vendors (vendor-specific controls). The request control classes can have constructors that accept arguments in a type-safe and user-friendly manner, and the response control classes can have access methods for getting the data of the response in a type-safe and user-friendly manner.

When a client sends a request control to a server, it specifies the control's criticality. The criticality determines whether the server can ignore the request control. When the server receives a critical request control, the server either processes the request with the control or rejects the entire request. When a server receives a noncritical request control, the server processes the request either with the control or by ignoring the control. The server does not reject the request simply because the server does not support the control. Additionally, a designer defining a control assigns that control a unique object identifier (OID). For example, the "sort" control has an identifier of 1.2.840.113556.1.4.473.

Although the LDAP provides an operation for searching a directory for entries whose attributes have specified values, using the search operation can be quite unwieldy when the performance of certain kinds of tasks is desired. One kind of task to which the search operation is not particularly well suited is a search for entities that are formally related to each other in a manner that is not captured by the hierarchical structure of the directory itself. For example, although each person's entry in a business organization's directory might indicate attributes that identify the entries of the person's friends, the hierarchical structure of the directory is not likely to be constructed based on friendships, and so there is not necessarily an easy way of determining a specified person's extended network of friends using the search operation. As matters currently stand, if a particular entry indicated that a particular person has three friends, then an application would issue a first search operation to the LDAP server to obtain the particular entry from the LDAP server, and then the application would inspect the "friends" attributes of that particular entry to determine who the particular person's immediate friends are. Next, to find the friends of those people (as part of an overarching attempt to discover the particular person's extended friends network), the application would issue subsequent separate search operations to the LDAP server for each immediate friend to obtain that immediate friend's entry from the LDAP server, and then the application would inspect the "friends" attributes of each of those entries to determine who the friends of the particular person's immediate friends are.

As can be imagined, the multiplicity of LDAP search operations complicates the design of a client application that performs such tasks relative to an LDAP directory. The multiplicity of LDAP search operations additionally degrades the performance of the overarching search task due to the consumption of a significant quantity of processing cycles on machines executing the client application and the LDAP server. The multiplicity of LDAP search operations also increases the expense of the overarching search task in terms of networking resources due to the significant network bandwidth that is consumed by each request-response exchange between the client application and the LDAP server.

BRIEF SUMMARY

Certain embodiments of the invention involve techniques for performing complex search tasks relative to an LDAP directory with a minimal quantity of LDAP search operations. Such techniques are especially useful for performing search tasks that follow relationships between LDAP entries (often specified by references in one LDAP entry to another LDAP entry), particularly under circumstances in which those relationships are not represented by the hierarchical structure of the LDAP directory. According to one technique, a client application specifies an LDAP control that the client application sends to the LDAP server along with the LDAP search operation. The LDAP server's receipt of the LDAP control causes the LDAP server to modify the behavior of the search operation so that the LDAP server follows potentially non-hierarchical specified relationships between the LDAP entries in determining the set of entries to return as results of the search operation. As a result, the LDAP server returns a complete set of related result entries to the client application in response to a single LDAP search operation received from the client application.

The foregoing, together with other features and embodiments will become more apparent when referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Figure 1:
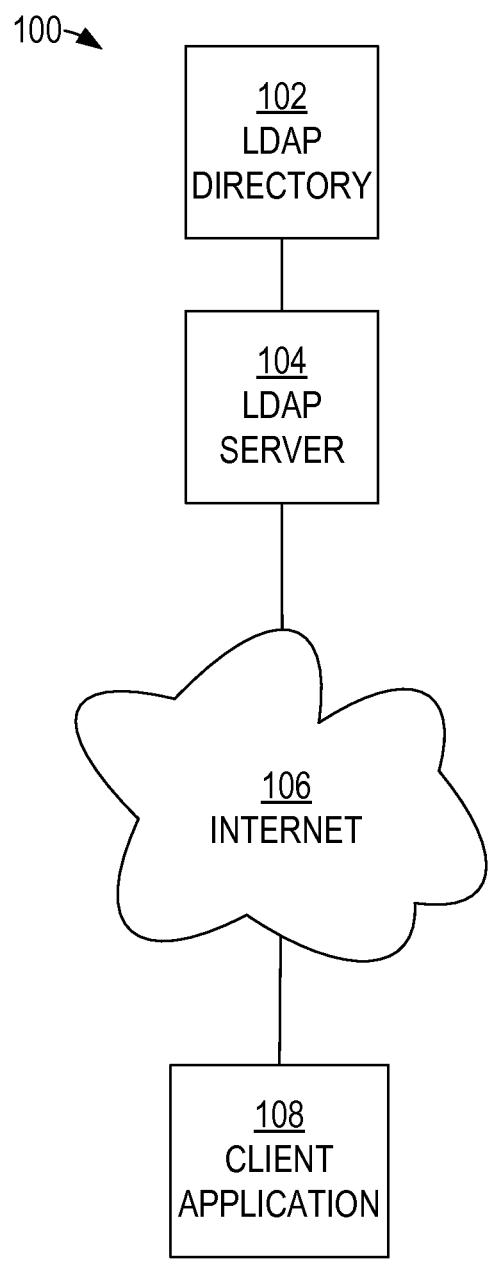
FIG. 1 is a block diagram that illustrates an example system in which a client application interacts with an LDAP server in order to retrieve search results from an LDAP directory, according to an embodiment of the present invention.

FIG. 1 is a block diagram that illustrates an example system 100 in which a client application interacts with an LDAP server in order to retrieve search results from an LDAP directory, according to an embodiment of the present invention. In system 100, an LDAP directory 102 is communicatively coupled to an LDAP server 104, which is communicatively coupled to the Internet 106, to which a client application 108 is also communicatively coupled. Thus, client application 108 can interact with LDAP server 104 by sending LDAP operations to, and receiving LDAP search results from, LDAP server 104 over Internet 106. In response to receiving an LDAP operation from client application 108, LDAP server 104 executes that operation relative to LDAP directory 102 in order to retrieve search results from LDAP directory 102, which LDAP server 104 then returns to client application 108 over Internet 106.

According to an embodiment of the invention, client application 108 can specify a special relationship-following LDAP request control that client application 108 sends to LDAP server 104 along with an LDAP search operation. The specification of the LDAP request control can include a unique OID for the LDAP request control, an indication that the LDAP request control is critical, and an identifier of an LDAP directory attribute that indicates the inter-entry relationships that the LDAP search is to follow in constructing search results. For example, the LDAP request control can take the form:

1.3.6.1.4.1.26027.2.3.1:true:friend

In this case, "1.3.6.1.4.1.26027.2.3.1" is the OID, "true" expresses criticality, and "friend" is the LDAP directory attribute that indicates the inter-entry relationships that the LDAP search is to follow in constructing search results. Because "friend" is the specified attribute, LDAP server 104 can modify the performance of the search operation that it performs (upon receiving the LDAP request control along with the LDAP search operation) so that LDAP server 104 potentially includes (depending on the search's scope), in its search, some immediately related LDAP directory entries that are specified as values of the base LDAP directory entry's "friends" attribute(s), and potentially (again depending on the search's scope) some non-immediately related LDAP directory entries that are specified as values of the "friends" attributes of those immediately related LDAP directory entries, and so on and so forth.

Essentially, the inclusion of the relationship-following LDAP request control with the LDAP search operation causes LDAP server 104 to expand its search along specified relationships (e.g., friends) by following references indicated as values of the specified relationship-indicating attributes (e.g., friends). In one embodiment of the invention, LDAP server 104 can be designed or modified or otherwise configured to recognize the special LDAP request control identified by its unique OID. In such an embodiment of the invention, LDAP server 104 can be designed or modified or otherwise configured to modify all LDAP search operations that are accompanied by this special LDAP request control so that those LDAP search operations are executed in a relationship-following manner such as that described above.

In an embodiment of the invention, client application 108 can send, to LDAP server 104, an LDAP search operation that specifies, as parameters, a search base, a search scope, and a search filter. In an embodiment of the invention, the receipt of the relationship-following LDAP request control along with the LDAP search operation causes LDAP server 104 to interpret these parameters in the following manner in its execution of the search operation relative to LDAP directory 102.

LDAP server 104 can interpret the value of the search base parameter to identify the particular LDAP directory entry at which the search operation is to be started; LDAP server 104 can follow the inter-entry references specified by this particular LDAP directory entry to discover the next "level" of LDAP directory entries that may qualify as search results (after which LDAP server 104 can follow the inter-entry references specified by those LDAP directory entries to discover yet the next "level" of LDAP directory entries that may qualify as search results, and so on and so forth). The specification of the base entry can have a significant impact on the constitution of the search results returned, inasmuch as some LDAP directory entries might not be related to some other LDAP directory entries by inter-entry references indicated as values of the control-specified attribute.

LDAP server 104 can interpret the value of the search scope parameter to identify the "depth," or the quantity of "levels," to which the inter-entry references of the LDAP directory entries are to be followed in compiling the search results. Put another way, LDAP server 104 can interpret the value of the scope parameter to identify the maximum number of "links" away from the base LDAP directory entry that LDAP server 104 is permitted to follow in compiling the search results. In the foregoing discussion, "links" refers to relations that exist due to a reference in one LDAP entry to another LDAP entry; "links" does not refer to the hierarchical relationships between LDAP entries that inherently exist due to the LDAP directory's structure.

For example, if the scope parameter is "base," then LDAP server 104 can exclude, from the search results, all LDAP directory entries that are not immediately related to, or are more than one link away from, the base LDAP directory entry. For another example, if the scope parameter is "one," then LDAP server 104 can exclude, from the search results, all LDAP directory entries that are more than two links away from the base LDAP directory entry. For another example, if the scope parameter is "sub," then LDAP server 104 can include, in the search results, all LDAP directory entries that can be discovered by following the inter-entry references, regardless of how distant in links those LDAP directory entries are from the base LDAP directory entry. For another example, if the scope parameter is "subordinate," then LDAP server 104 can include, in the search results, all LDAP directory entries that would be returned if the scope parameter were "sub," except for the base LDAP directory entry itself (which is excluded from the search results).

LDAP server 104 can interpret the value of the search filter parameter to identify criteria that an LDAP directory entry must satisfy in order to be included in the search results, regardless of whether that LDAP directory entry can be discovered by repeatedly following inter-entry relationships radiating outward from the base LDAP directory entry. Thus, even if a particular LDAP directory entry falls within the specified search scope, that particular LDAP directory entry can be excluded from the search results if the values of that particular LDAP directory entry's attributes fail to satisfy the criteria that the search filter parameter specifies. For example, the search filter parameter might specify, as a criterion, that a particular LDAP directory entry's location attribute must have a value that is within a specified distance away from a location attribute of the base LDAP directory entry's location attribute. Under such circumstances, all LDAP directory entries whose location attribute values were beyond the specified distance away from the base LDAP directory entry's location attribute value would be excluded from the search results even if those LDAP directory entries were directly referenced by the control-specified attribute of the base LDAP directory entry.

Figure 2:
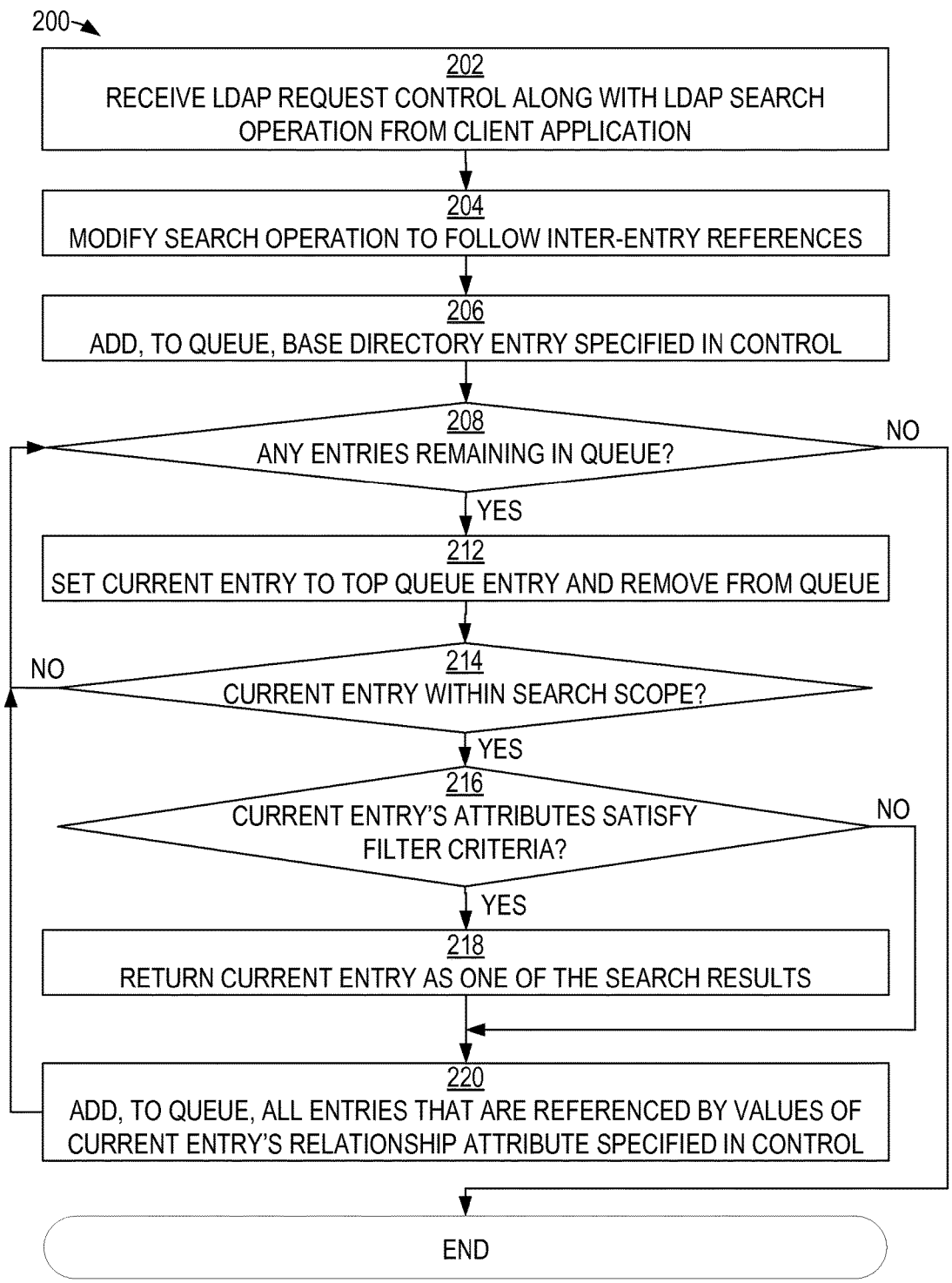
FIG. 2 is a flow diagram that illustrates an example technique for retrieving search results from an LDAP directory in a manner that follows inter-entry references specified as attribute values within the LDAP directory entries, according to an embodiment of the present invention.

FIG. 2 is a flow diagram that illustrates an example technique 200 for retrieving search results from an LDAP directory in a manner that follows inter-entry references specified as attribute values within the LDAP directory entries, according to an embodiment of the present invention. Although example technique 200 is shown as involving certain operations being performed in a certain order, alternative embodiments of the invention can involve variations of technique 200 that include additional operations, involve fewer operations, and/or perform operations in a different order than that shown. Technique 200 can be performed by LDAP server 104 of FIG. 1, for example.

In block 202, the LDAP server can receive, from a client application, an LDAP request control along with an LDAP search operation. The LDAP request control can specify an OID that causes the LDAP server to recognize the LDAP request control as being a control that instructs the LDAP server to perform the search operation in a manner that follows inter-entry references in compiling search results.

In block 204, in response to receiving the LDAP request control, the LDAP server can modify the performance of the search operation to follow inter-entry references in compiling search results. In block 206, the LDAP server can add, to a queue of LDAP directory entries, a base LDAP directory entry that is specified as a parameter of the LDAP search operation. In block 208, the LDAP server can determine whether any LDAP directory entries remain in the queue of LDAP directory entries. If at least one LDAP directory entry remains in the queue of LDAP directory entries, then control passes to block 212. Otherwise, if the queue of LDAP directory entries is empty, then technique 200 ends; the LDAP server has at this point returned the complete set of search results to the client application as a response to the LDAP search operation that the LDAP server received from the client application in block 202.

In block 212, the LDAP server can remove, from the queue of LDAP directory entries, the particular LDAP directory entry that is on the top of that queue, and can set the current LDAP directory entry to be that particular LDAP directory entry. In block 214, the LDAP server can determine whether the current LDAP directory entry is within a search scope that is specified as a parameter of the LDAP search operation. If the current LDAP directory entry is within the specified search scope, then control passes to block 216. Otherwise, if the current LDAP directory entry is not within the specified search scope, then control passes back to block 208; under such circumstances, the LDAP server does not add the current LDAP directory entry to the set of search results that the LDAP server is compiling.

In block 216, the LDAP server can determine whether the current LDAP directory entry's attribute values satisfy all filter criteria that are specified as a parameter of the LDAP search operation. If the current LDAP directory entry's attribute values satisfy all those filter criteria, then control passes to block 218. Otherwise, if the current LDAP directory entry's attribute values fail to satisfy at least one of those filter criteria, then control passes to block 220; under such circumstances, the LDAP server does not return the current LDAP directory entry as a search result.

In block 218, the LDAP server can return the current LDAP directory entry as one of the search results that the LDAP server is retrieving. Control then passes to block 220.

In block 220, the LDAP server can add, to the queue of LDAP directory entries, all LDAP directory entries that are referenced by values of the current LDAP directory entry's relationship attribute. As is discussed above, the relationship attribute to be examined can be the attribute that is specified as a parameter in the LDAP request control that the LDAP server received along with the LDAP search operation in block 202. Thus, for example, if the LDAP request control specifies "friend" as a parameter, then the LDAP server can add, to the queue of LDAP directory entries, all LDAP directory entries that are referenced by values of the current LDAP directory entry's "friend" attribute. In one embodiment of the invention, the LDAP server can add these related LDAP directory entries to the queue of LDAP directory entries even if the current LDAP entry is to be excluded from the search results due to its failure to satisfy the search filter criteria. In an embodiment of the invention, the LDAP server can refrain from adding, to the queue of LDAP directory entries, any LDAP directory entries that the LDAP server has previously added to the queue during the execution of this particular instance of the LDAP search operation, in order to avoid following infinite loops; the LDAP server can maintain a separate list of such previously added LDAP directory entries. Control then passes back to block 208.

As can be seen from the discussion of FIG. 2 above, in an embodiment of the invention, the LDAP server returns each search result to the client application as that search result is located.

Following is an example of an LDAP directory entry that could be specified within an LDAP directory relative to which technique 200 could be performed. As will be seen below, the example LDAP directory entry includes, among other attributes, three "friend" attributes that have values that refer to other LDAP directory entries within the same LDAP directory. Technique 200 can follow such inter-entry references in executing a relationship-following search operation as described above. Significantly, these references might not be (and, in an embodiment, are not) apparent at all from the inherent hierarchical structure of the LDAP directory tree:

dn: uid=user.3, ou=people, dc=example, dc=com
    objectClass: person
    objectClass: organizationalperson
    objectClass: inetorgperson
    objectClass: top
    uid: user.3
    cn: Kenny McCormick
    sn: McCormick
    friend: uid=user.0, ou=people, dc=example, dc=com
    friend: uid=user.1, ou=people, dc=example, dc=com
    friend: uid=user.2, ou=people, dc=example, dc=com
    location: 46.444718, 6.911774

If the LDAP request control specified "friend" as the attribute that specified the inter-entry relationships that the LDAP server were to follow in performing the search operation, then the values of these "friend" attributes of the above example LDAP directory entry would, in one embodiment, cause the LDAP server to examine the LDAP directory entries having "user.0," "user.1," and "user.2" as the respective values of their "uid" attributes, to determine whether these LDAP directory entries also fell within the search scope and satisfied the search filter criteria. If these directory entries fell within the search scope and satisfied the search filter criteria, then these entries could be returned within the LDAP search results even if they were not hierarchically descended from the base search entry or any other particular entry in the LDAP directory. Provided that the search scope was not at that point exhausted, the friend attributes of these LDAP directory entries could then be examined and potentially followed in like manner.

Figure 5:
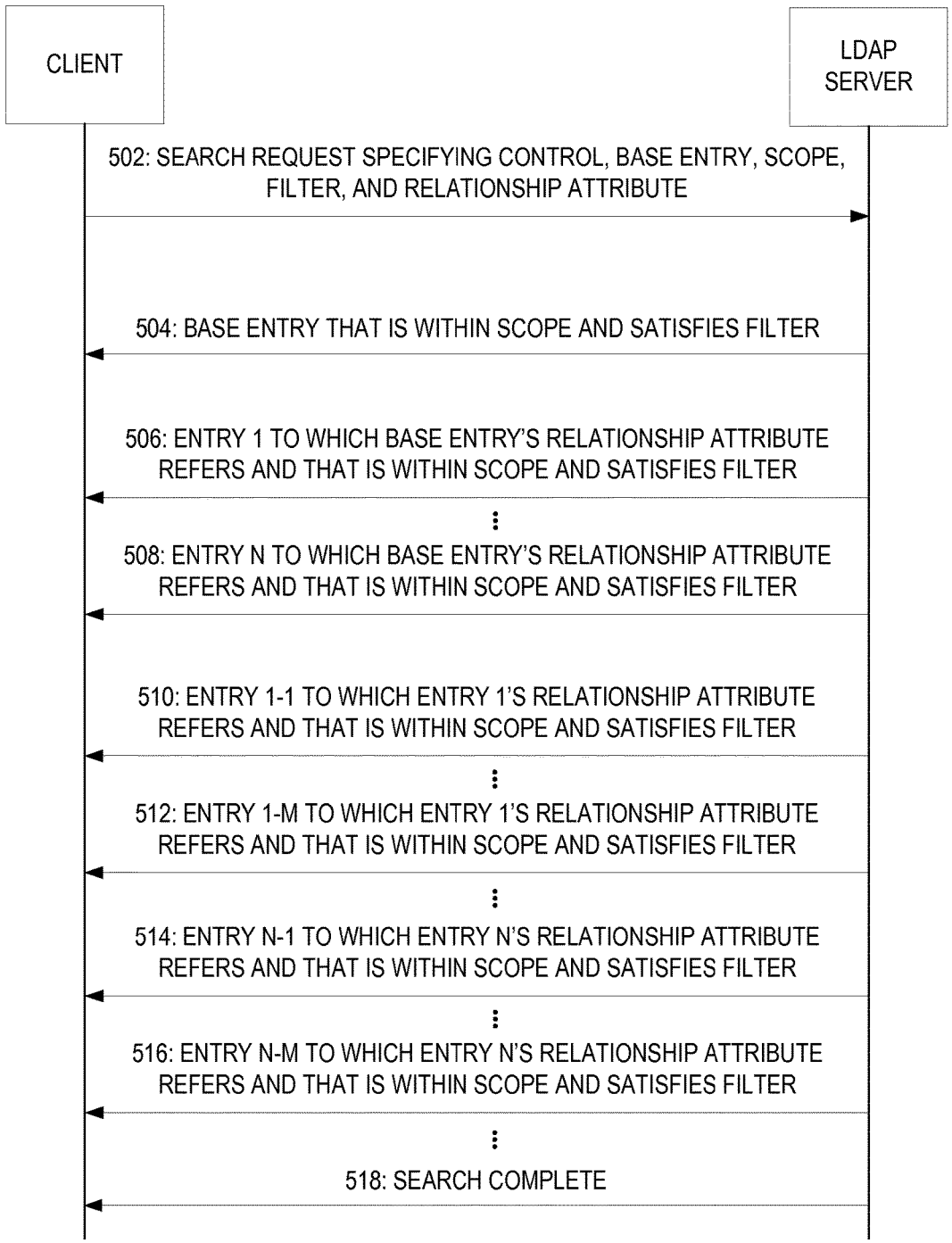
FIG. 5 is a diagram that illustrates an example of a single request/response cycle occurring between a client application and an LDAP server involving the LDAP server's following of inter-entry relationships specified within LDAP entries, according to an embodiment of the invention.

FIG. 5 is a diagram that illustrates an example of a single request/response cycle occurring between a client application and an LDAP server involving the LDAP server's following of inter-entry relationships specified within LDAP entries, according to an embodiment of the invention. In FIG. 5, the passage of time is represented spatially in the vertical direction; time flows from top to bottom.

At operation 502, the client sends, to the LDAP server, a search request that specifies the control discussed herein, a base entry, a scope, a filter, and a relationship attribute. Starting at operation 504, the LDAP server begins to process the search request in the special inter-entry link following manner dictated by the control. Notably, in an embodiment, the client does not send any further request to the LDAP server prior to the conclusion of the search at operation 518.

At operation 504, the LDAP server returns, to the client, as a search result, the "first generation" base entry, assuming that the base entry is within the specified scope and that the base entry satisfies the specified filter. The LDAP server then follows each of the links expressed by each of the base entry's attributes that have the same name (but not necessarily the same value) as the specified relationship attribute.

At operation 506, the LDAP server returns, to the client, as a search result, a "second generation" Entry 1 that the LDAP server followed from a link expressed in the base entry, assuming that Entry 1 is within the specified scope and that Entry 1 satisfies the specified filter. Assuming that the specified scope is not yet exhausted, the LDAP server will eventually follow each of the links expressed by each of Entry 1's attributes that have the same name (but not necessarily the same value) as the specified relationship attribute.

The LDAP server may continue through each of the base entry's links in a similar manner, eventually reaching the last such link to a "second generation" Entry N. At operation 508, the LDAP server returns, to the client, as a search result, Entry N that the LDAP server followed from a link expressed in the base entry, assuming that Entry N is within the specified scope and that Entry N satisfies the specified filter. Assuming that the specified scope is not yet exhausted, the LDAP server will eventually follow each of the links expressed by each of Entry N's attributes that have the same name (but not necessarily the same value) as the specified relationship attribute.

At operations 510 through 512, the LDAP server returns, to the client, as search results, "third generation" Entries 1-1 through 1-M that the LDAP server followed from links expressed in Entry 1, assuming that Entries 1-1 through 1-M are each within the specified scope and that those entries satisfy the specified filter. Assuming that the specified scope is not yet exhausted, the LDAP server will eventually follow each of the links expressed by each of Entry 1-1's through Entry 1-M's attributes that have the same name (but not necessarily the same value) as the specified relationship attribute.

The LDAP server may continue through each of the "second generation" entry's links in a similar manner, eventually reaching the last such links to "third generation" Entries N-1 through N-M. At operations 514 through 516, the LDAP server returns, to the client, as search results, "third generation" Entries N-1 through N-M that the LDAP server followed from links expressed in Entry N, assuming that Entries N-1 through N-M are each within the specified scope and that those entries satisfy the specified filter. Assuming that the specified scope is not yet exhausted, the LDAP server will eventually follow each of the links expressed by each of Entry N-1's through Entry N-M's attributes that have the same name (but not necessarily the same value) as the specified relationship attribute.

Eventually, the search scope may be exhausted, and/or no more links may remain to be followed. At that point, the LDAP server optionally may send, to the client, an indication that the search is complete at operation 518. Notably, each of the search results in the foregoing operations are returned in response to a single client request 502. The client does not need to send multiple requests to the LDAP server to cause the LDAP server to follow the inter-entry links indicated by the values of the request-specified relationship attribute.

In one embodiment, mechanisms exist to halt a search even if the specified scope has not yet been exhausted and even if qualifying inter-entry links still remain to be followed. For example, in one embodiment, prior to the conclusion of the search, the client may send, to the LDAP server, an extended "cancel" request. In an embodiment, the receipt of such a request causes the LDAP server to halt and discontinue the current search, ending with the last result returned, if any. For another example, in one embodiment, the LDAP server can be configured, exclusive of any direction by the client, to halt and discontinue all searches that exceed a specified maximum quantity of search results. For yet another example, in one embodiment, the LDAP server can be configured, exclusive of any direction by the client, to halt and discontinue all searches whose execution times exceed a specified maximum execution time. Under such conditions, the LDAP server can optionally inform the client of the reason that the search was halted and discontinued, so that the client is aware that the result set might not be complete. Additionally or alternatively, in one embodiment, the client can specify such maximum quantity and/or maximum search time limits to the LDAP server along with the search request, and the LDAP server accordingly abides by such constraints.

Figure 3:
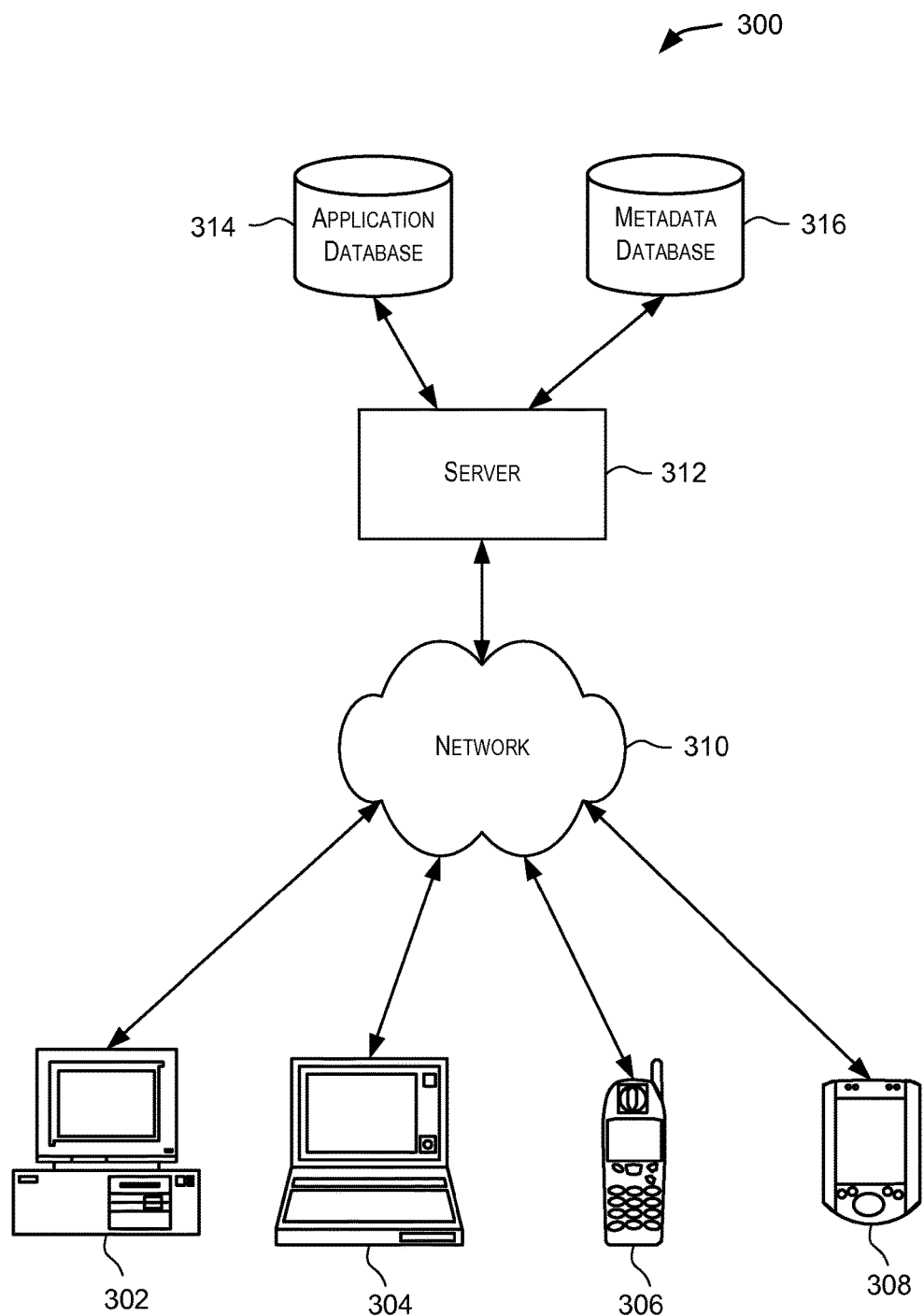
FIG. 3 is a simplified block diagram illustrating components of a system environment that may be used in accordance with an embodiment of the present invention.

FIG. 3 is a simplified block diagram illustrating components of a system environment 300 that may be used in accordance with an embodiment of the present invention. As shown, system environment 300 includes one or more client computing devices 302, 304, 306, 308, which are configured to operate a client application such as a web browser, proprietary client (e.g., Oracle Forms), or the like. In various embodiments, client computing devices 302, 304, 306, and 308 may interact with a server 312.

Client computing devices 302, 304, 306, 308 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 302, 304, 306, and 308 may be any other electronic device, such as a thin-client computer, Internet-enabled gaming system, and/or personal messaging device, capable of communicating over a network (e.g., network 310 described below). Although exemplary system environment 300 is shown with four client computing devices, any number of client computing devices may be supported. Other devices such as devices with sensors, etc. may interact with server 312.

System environment 300 may include a network 310. Network 310 may be any type of network familiar to those skilled in the art that can support data communications using any of a variety of commercially-available protocols, including without limitation TCP/IP, SNA, IPX, AppleTalk, and the like. Merely by way of example, network 310 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 300 also includes one or more server computers 312 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 312 may be adapted to run one or more services or software applications described in the foregoing disclosure. For example, server 312 may correspond to LDAP server 104 of FIG. 1, which has been configured to recognize and respond to the relationship-following LDAP request control discussed above.

Server 312 may run an operating system including any of those discussed above, as well as any commercially available server operating system. Server 312 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 300 may also include one or more databases 314, 316. Databases 314, 316 may reside in a variety of locations. By way of example, one or more of databases 314, 316 may reside on a storage medium local to (and/or resident in) server 312. Alternatively, databases 314, 316 may be remote from server 312, and in communication with server 312 via a network-based or dedicated connection. In one set of embodiments, databases 314, 316 may reside in a storage-area network (SAN) familiar to those skilled in the art. Similarly, any necessary files for performing the functions attributed to server 312 may be stored locally on server 312 and/or remotely, as appropriate. In one set of embodiments, databases 314, 316 may include relational databases, such as Oracle 10g, which are adapted to store, update, and retrieve data in response to SQL-formatted commands.

Figure 4:
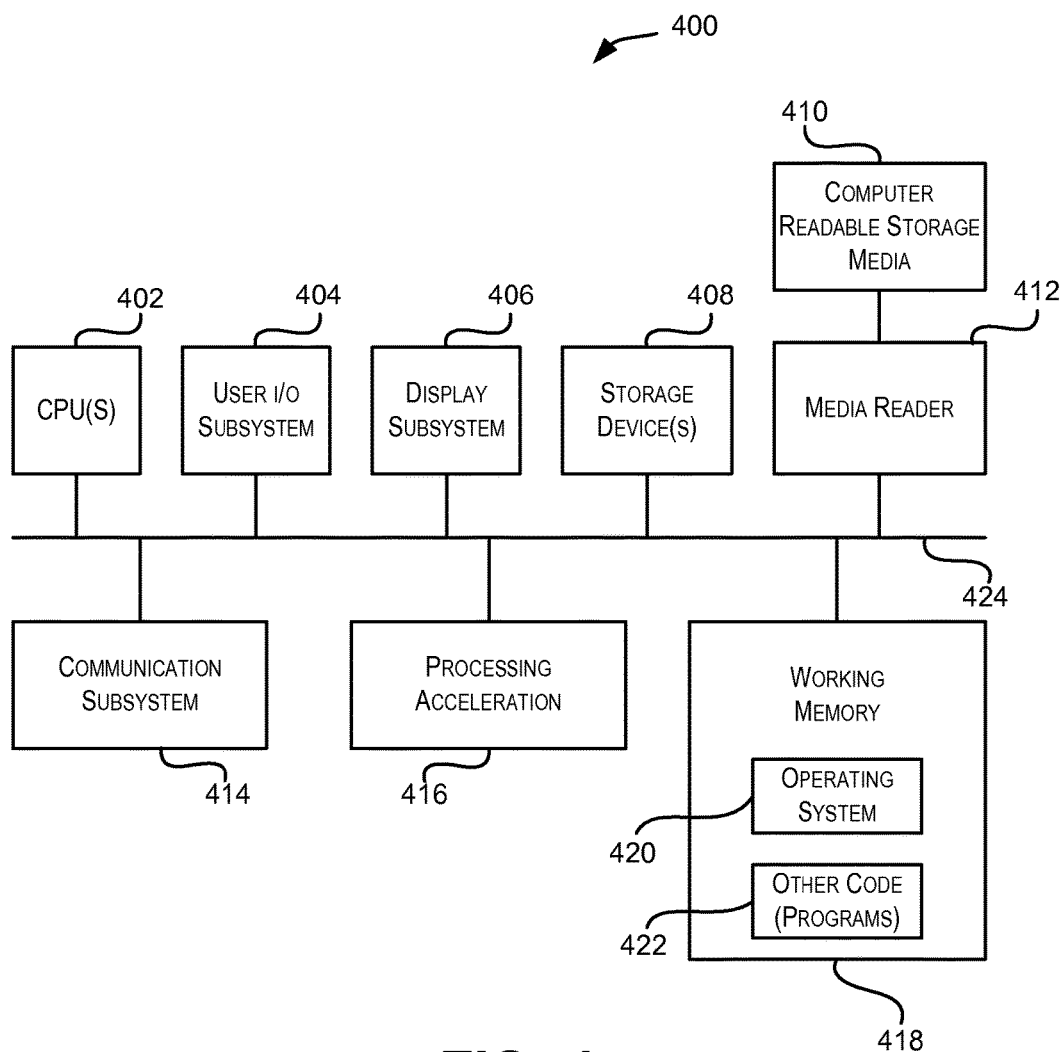
FIG. 4 is a simplified block diagram of a computer system that may be used in accordance with embodiments of the present invention.

FIG. 4 is a simplified block diagram of a computer system 400 that may be used in accordance with embodiments of the present invention. For example, a continuous even processing server may be implemented using a system such as system 400. Computer system 400 is shown comprising hardware elements that may be electrically coupled via a bus 424. The hardware elements may include one or more central processing units (CPUs) 402, one or more input devices 404 (e.g., a mouse, a keyboard, etc.), and one or more output devices 406 (e.g., a display device, a printer, etc.). Computer system 400 may also include one or more storage devices 408. By way of example, the storage device(s) 408 may include devices such as disk drives, optical storage devices, and solid-state storage devices such as a random access memory (RAM) and/or a read-only memory (ROM), which can be programmable, flash-updateable and/or the like.

Computer system 400 may additionally include a computer-readable storage media reader 412, a communications subsystem 414 (e.g., a modem, a network card (wireless or wired), an infra-red communication device, etc.), and working memory 418, which may include RAM and ROM devices as described above. In some embodiments, computer system 400 may also include a processing acceleration unit 416, which can include a digital signal processor (DSP), a special-purpose processor, and/or the like.

Computer-readable storage media reader 412 can further be connected to a computer-readable storage medium 410, together (and, optionally, in combination with storage device(s) 408) comprehensively representing remote, local, fixed, and/or removable storage devices plus storage media for temporarily and/or more permanently containing computer-readable information. Communications system 414 may permit data to be exchanged with a network and/or any other computer described above with respect to the system environment.

Computer system 400 may also comprise software elements, shown as being currently located within working memory 418, including an operating system 420 and/or other code 422, such as an application program (which may be a client application, Web browser, mid-tier application, RDBMS, etc.). In an exemplary embodiment, working memory 418 may include executable code and associated data structures (such as caches) used for the techniques described above. It should be appreciated that alternative embodiments of computer system 400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A computer-readable memory storing a plurality of instructions for causing a processor to perform operations, the plurality of instructions comprising:
   instructions that cause the processor to receive a request to execute a lightweight directory access protocol (LDAP) search operation and a LDAP request control, wherein the LDAP request control identifies an attribute associated with an entry of an LDAP directory;
   instructions that cause the processor to, in response to receiving the LDAP request control, modify execution of the LDAP search operation to locate one or more entries in one or more LDAP directories, wherein the execution is modified to follow references based on the attribute, and wherein the modified execution of the LDAP search operation includes;
      based on identifying a first entry of a first LDAP directory responsive to the LDAP search operation, determining that the identified first entry includes a first attribute that matches the attribute identified by the LDAP request control, wherein the first attribute identifies a second entry of a second LDAP directory; and
      identifying that the second entry has a second attribute, the second attribute matching the attribute indicated by the LDAP request control, and wherein the second attribute identifies a third entry of a third LDAP directory; and
   instructions that cause the processor to send a search result for the LDAP search operation, wherein the search result includes first data retrieved from the identified first entry, second data retrieved from the identified second entry, and third data retrieved from the identified third entry.

2. The computer-readable memory of claim 1, wherein the LDAP search operation includes one or more search criteria, and wherein the modified execution of the LDAP search operation further includes:
   determining that the identified first entry satisfies the one or more search criteria; and
   determining that the second entry satisfies the one or more search criteria.

3. The computer-readable memory of claim 1, wherein the LDAP search operation includes a search scope, and wherein the modified execution of the LDAP search operation further includes:
   determining that the identified first entry falls within the search scope; and
   determining that the second entry falls within the search scope.

4. The computer-readable memory of claim 1, wherein the LDAP search operation further includes a search scope, and wherein the modified execution of the LDAP search operation further includes determining that the third entry falls within the search scope.

5. The computer-readable memory of claim 1, wherein the modified execution of the LDAP search operation further includes determining, for each entry that falls within a search scope, a set of distinguished names that are associated with one or more values of the attribute.

6. The computer-readable memory of claim 1, wherein the modified execution of the LDAP search operation further includes:
   determining, for each entry that falls within a search scope, a set of distinguished names that are associated with one or more values of the attribute, wherein the LDAP search operation includes the search scope; and
   determining, for each entry that is uniquely identified by a distinguished name in the set of distinguished names, whether the entry satisfies one or more search criteria, wherein the LDAP search operation further includes the one or more search criteria;

wherein the one or more values of the attribute identify relationships between entries, and wherein the entries are not included in a structure of a hierarchy of the one or more LDAP directories.

7. The computer-readable memory of claim 1, wherein the first LDAP directory is the second LDAP directory, and wherein the second LDAP directory is the third LDAP directory.

8. A system for processing lightweight directory access protocol (LDAP) operations, the system comprising:
a memory storing a plurality of instructions; and
a processor coupled to the memory, the processor configured to execute the plurality of instructions to:
receive a request to execute a lightweight directory access protocol (LDAP) search operation and a LDAP request control, wherein the LDAP request control identifies an attribute associated with an entry of an LDAP directory;
in response to receiving the LDAP request control, execute, using the LDAP request control, the LDAP search operation to locate one or more entries in one or more LDAP directories, wherein executing the LDAP search operation includes:
responsive to the LDAP search operation, identifying a first entry of a first LDAP directory;
determining that the identified first entry includes a first attribute that matches the attribute identified by the LDAP request control, wherein the first attribute identifies a second entry of a second LDAP directory; and
identifying that the second entry has a second attribute, wherein the second attribute matches the attribute indicated by the LDAP request control, and wherein the second attribute identifies a third entry of a third LDAP directory; and
send a search result for execution of the LDAP search operation, wherein the search result includes data retrieved from the identified first entry, the identified second entry, and the identified third entry.

9. The system of claim 8, wherein the LDAP search operation includes one or more search criteria, and wherein executing the LDAP search operation further includes:
determining that the identified first entry satisfies the one or more search criteria; and
determining that the second entry satisfies the one or more search criteria.

10. The system of claim 8, wherein the LDAP search operation includes a search scope, and wherein executing the LDAP search operation further includes:
determining that the identified first entry falls within the search scope; and
determining that the second entry falls within the search scope.

11. The system of claim 8, wherein the LDAP search operation further includes a search scope, and wherein executing the LDAP search operation further includes determining that the third entry falls within the search scope.

12. The system of claim 8, wherein executing the LDAP search operation further includes determining, for each entry that falls within a search scope received with the LDAP search operation, a set of distinguished names that are associated with one or more values of the attribute.

13. A method for processing a lightweight directory access protocol (LDAP) operation, the method comprising:
receiving a request to execute a lightweight directory access protocol (LDAP) search operation and a LDAP request control, wherein the LDAP request control identifies an attribute associated with an entry of an LDAP directory;
in response to receiving the LDAP request control, executing, using the LDAP request control, the LDAP search operation to locate one or more entries in one or more LDAP directories, wherein executing the LDAP search operation includes:
responsive to the LDAP search operation, identifying a first entry of a first LDAP directory;
determining that the identified first entry includes a first attribute that matches the attribute identified by the LDAP request control, wherein the first attribute identifies a second entry of a second LDAP directory; and
identifying that the second entry has a second attribute, wherein the second attribute matches the attribute indicated by the LDAP request control, and wherein the second attribute identifies a third entry of a third LDAP directory; and
sending a search result for execution of the LDAP search operation, wherein the search result includes data retrieved from the identified first entry, the second entry, and the third entry, and wherein the second entry was identified by the first attribute of the identified first entry.

14. The method of claim 13, wherein the LDAP search operation includes one or more search criteria, and wherein executing the LDAP search operation further includes:
determining that the identified first entry satisfies the one or more search criteria; and
determining that the second entry satisfies the one or more search criteria.

15. The method of claim 13, wherein the LDAP search operation includes a search scope, and wherein executing the LDAP search operation further includes:
determining that the identified first entry falls within the search scope; and
determining that the second entry falls within the search scope.

16. The method of claim 13, wherein the LDAP search operation includes a search scope, and wherein executing the LDAP search operation further includes determining that the third entry falls within the search scope.

17. The method of claim 13, wherein executing the LDAP search operation further includes determining, for each entry that falls within a search scope, a set of distinguished names that are associated with one or more values of the attribute.

* * * * *

UNITED STATES PATENT AND TRADEMARK OFFICE
CERTIFICATE OF CORRECTION

| | |
|---|---|
| PATENT NO. | : 9,608,958 B2 |
| APPLICATION NO. | : 14/091214 |
| DATED | : March 28, 2017 |
| INVENTOR(S) | : Bobrov et al. |

Page 1 of 1

It is certified that error appears in the above-identified patent and that said Letters Patent is hereby corrected as shown below:

On the Title Page

On page 3, item [56], Column 2, under Other Publications, Line 66, delete "Realibily" and insert -- Reliability --, therefor.

In the Claims

Column 14, Line 9, Claim 1, delete "includes;" and insert -- includes: --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*